United States Patent
Tanida et al.

(10) Patent No.: US 8,237,841 B2
(45) Date of Patent: Aug. 7, 2012

(54) COMPOUND-EYE IMAGING DEVICE

(75) Inventors: Jun Tanida, Suita (JP); Ryoichi Horisaki, Suita (JP); Takashi Toyoda, Daito (JP); Yoshizumi Nakao, Daito (JP); Yasuo Masaki, Daito (JP)

(73) Assignee: Funai Electric Co., Ltd., Daito-shi (JP)

( * ) Notice: Subject to any disclaimer, the term of this patent is extended or adjusted under 35 U.S.C. 154(b) by 502 days.

(21) Appl. No.: 12/395,971

(22) Filed: Mar. 2, 2009

(65) Prior Publication Data
US 2009/0225203 A1    Sep. 10, 2009

(30) Foreign Application Priority Data
Feb. 28, 2008    (JP) .................................. 2008-048035

(51) Int. Cl.
*H04N 5/225*    (2006.01)
*G02B 13/16*    (2006.01)

(52) U.S. Cl. ......... 348/335; 348/340; 348/345; 348/348

(58) Field of Classification Search .................. 348/335, 348/340, 345, 348; 250/208.1; 257/290–292
See application file for complete search history.

(56) References Cited

U.S. PATENT DOCUMENTS

| | | | |
|---|---|---|---|
| 6,765,617 B1 | 7/2004 | Tangen et al. | |
| 6,987,258 B2 * | 1/2006 | Mates | 250/208.1 |
| 7,009,652 B1 | 3/2006 | Tanida et al. | |
| 7,423,679 B2 * | 9/2008 | Szajewski et al. | 348/308 |
| 2006/0072029 A1 | 4/2006 | Miyatake et al. | |
| 2009/0160997 A1 | 6/2009 | Oyama et al. | |

FOREIGN PATENT DOCUMENTS

| | | |
|---|---|---|
| JP | 2001-61109 A | 3/2001 |
| JP | 2001-523929 A | 11/2001 |
| JP | 2003-283907 A | 10/2003 |
| JP | 2004-146619 A | 5/2004 |
| JP | 2005-341301 A | 12/2005 |
| JP | 2007-325202 A | 12/2007 |
| WO | WO 2007/060847 A1 | 5/2007 |

* cited by examiner

*Primary Examiner* — Yogesh Aggarwal
(74) *Attorney, Agent, or Firm* — Crowell & Moring LLP (57) ABSTRACT

A compound-eye imaging device comprises an imaging device body having 9 optical lenses and a solid-state imaging element for imaging unit images formed by the optical lenses. Assuming that the combination of each of the optical lenses with a corresponding divided area of the solid-state imaging element to image each of the corresponding unit images is an imaging unit, thereby forming multiple imaging units, the respective imaging units have randomly different optical imaging conditions. For example, the focal lengths of the 9 optical lenses are set to have random values in which the optical lenses are arranged to have random distances between adjacent ones thereof in a direction parallel to the major surface of the solid-state imaging element. This compound-eye imaging device substantially prevents unit images formed by respective imaging units from being the same, making it possible to easily increase the definition of a reconstructed image.

2 Claims, 7 Drawing Sheets

COMPOUND-EYE IMAGING DEVICE

BACKGROUND OF THE INVENTION

1. Field of the Invention

The present invention relates to a compound-eye imaging device.

2. Description of the Related Art

Figure 9:
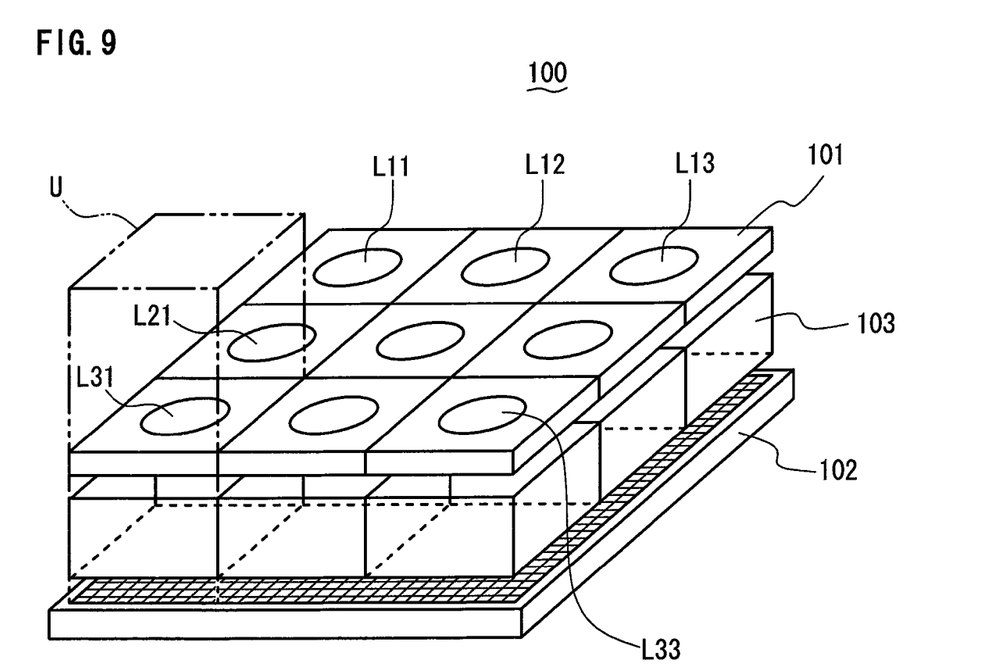
FIG. 9 is a schematic perspective view of a part of a conventional compound-eye imaging device.

A compound-eye imaging device is known which comprises an optical lens array having multiple micro optical lenses arranged in a matrix of rows and columns, and a solid-state imaging element (photodetector array) for imaging multiple unit images of a target object which are formed by the respective optical lenses of the optical lens array so as to reconstruct the multiple unit images into a reconstructed image (refer to e.g. Japanese Laid-open Patent Publication 2001-61109). FIG. 9 is a schematic perspective view of a part of such conventional compound-eye imaging device 100.

As shown in FIG. 9, the compound-eye imaging device 100 has an optical lens array 101 and a solid-state imaging element 102 as well as a partitioning wall 103 placed between the optical lens array 101 and the solid-state imaging element 102 so as to allow lights collected by respective optical lenses L11, L12 ... L33 to reach the solid-state imaging element 102 without interference therebetween, thereby forming high definition images by the respective optical lenses L11, L12 ... L33, making it possible to obtain a high definition reconstructed image. In the following description, the combination of one optical lens (e.g. optical lens L31) with an area of the solid-state imaging element 102 to image a unit image formed by the one optical lens will be referred to as imaging unit U as shown by the double-dot dashed line in FIG. 9.

Here, a mechanism to allow a compound-eye imaging device to form a high definition reconstructed image from multiple unit images will be explained with reference to FIG. 9. In the compound-eye imaging device 100, the optical lenses L11, L12 ... L33 are distributed on the optical lens array 101 in a matrix of rows and columns, so that the respective unit images formed on the solid-state image element 102 are images which are viewed at angles slightly different from one another relative to the target object (i.e. images with parallax). By using unit images which are thus slightly different from one another to have slightly different information, it is possible to form a reconstructed image based on the larger amount of information, making it possible for the reconstructed image to have a higher definition than that of each unit image.

However, in the compound-eye imaging device 100 described above, the optical lenses L11, L12 ... L33 are regularly arranged at a constant distance or interval, so that the unit images formed by the optical lenses L11, L12 ... L33 may in some cases be substantially the same as each other, if, for example, the target object is positioned at a predetermined distance from the compound-eye imaging device 100 as described later, or if the target object is indefinitely far from the compound-eye imaging device. In such cases, the amount of information used to form a reconstructed image decreases, preventing the reconstructed image from having a higher definition than that of each unit image.

Figure 10A:
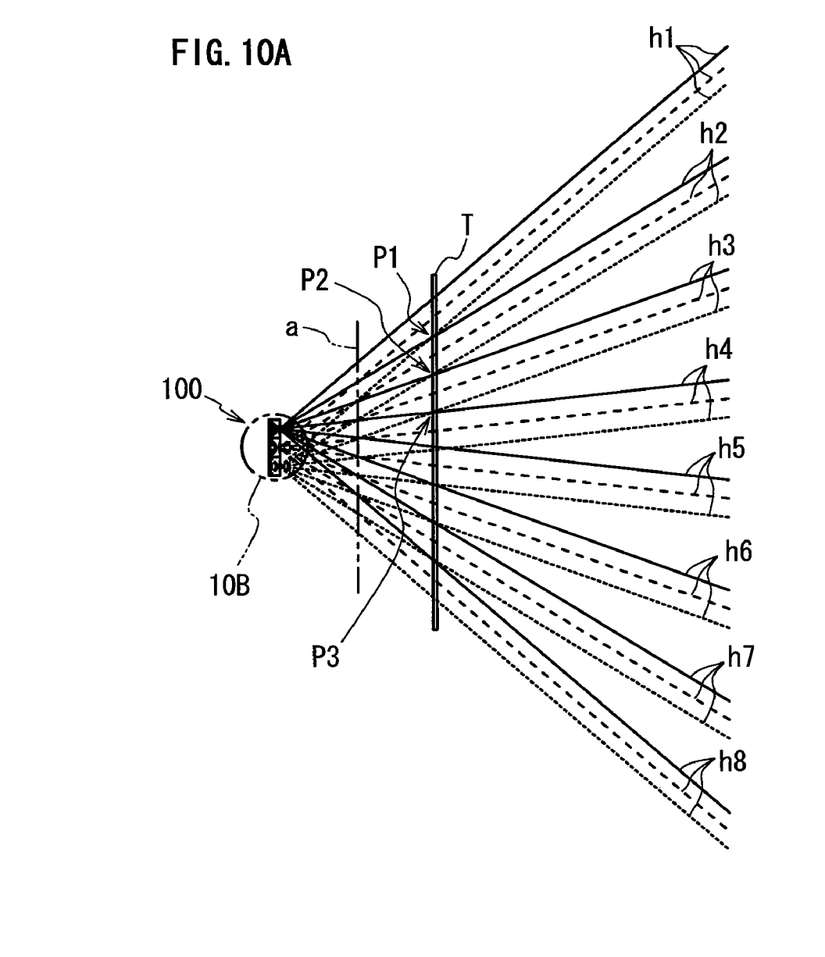
Figure 10B:
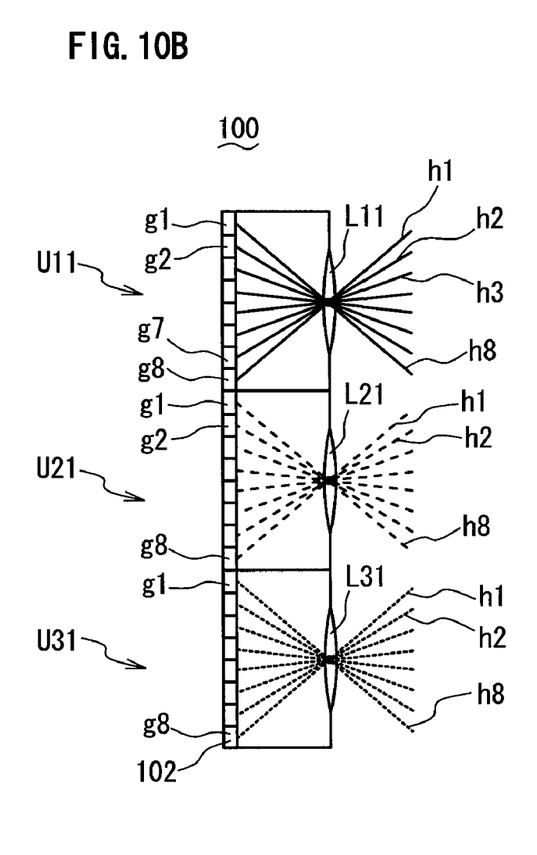
FIG. 10B is a schematic enlarged side view of a portion of FIG. 10A as indicated by dashed circle 10B.

The case where the unit images formed by the optical lenses are substantially the same will be described with reference to FIGS. 10A and 10B. FIG. 10A is a schematic side view of the compound-eye imaging device 100, placed vertically, in a mode of collecting lights from a target object T by the optical lenses L11, L12 ... L33, in which the target object T is positioned in front of, and at a predetermined distance from, the compound-eye imaging device 100. FIG. 10B is a schematic enlarged side view of a portion of FIG. 10A as indicated by the dashed circle 10B. In FIG. 10B, the three optical lenses L11, L21 and L31 in the leftmost column of FIG. 9 are shown, in which the solid-state imaging element 102 is assumed to have 8 (eight) pixels for each of the optical lenses L11, L21 and L31.

Both FIG. 10A and FIG. 10B show light traces of lights collected by the respective optical lenses L11, L21 and L31 to reach the respective pixels of the solid-state imaging element 102, in which such light traces for the optical lenses L11, L21 and L31 are shown by solid lines, coarse dashed lines and fine dashed lines in order from top to bottom. More specifically, in the case of the optical lens L11, for example, the uppermost light denoted by h1 passes through the optical lens L11, and is collected onto the lowermost pixel denoted by g8. Similarly, the n-th light from the top which can be designated by hn passes through the optical lens L11, and is collected onto the (9−n)th pixel from the top which can be denoted by g(9−1). The lowermost light denoted by h8 passes through the optical lens L11, and is collected onto the uppermost pixel denoted by g1. Using the definition above, the combinations of the optical lens L11, L21 and L31 with corresponding areas of the solid-state imaging element 102 to image unit images formed by the optical lenses L11, L21 and L31 can be referred to as imaging units U11, U21 and U31, respectively, as shown in FIG. 10B.

Now, assuming that the target object T is positioned in front of, and at a predetermined distance, from the compound-eye imaging device 100, FIGS. 10A and 10B show the case where light from a point P1 on the target object T is collected by the optical lens L11 as light h2 and imaged by pixel g7 in the imaging unit U11, and is at the same time collected by the optical lens L31 as light h1 and imaged by pixel g8 in the imaging unit U31. Thus, the image of the point P1 imaged by the pixel g7 in the imaging unit U11 is the same as the image of the point P1 imaged by the pixel g8 in the imaging unit U31. This indicates that points on the target object T where the light traces h1, h2, h3 ... intersect, that are P1, P2, P3 ..., can be imaged as the same image by different imaging units U.

Thus, it is understood that the conventional compound-eye imaging device 100 with regularly arranged optical lenses (L11, L12 ... L33) has a plane, which can be referred to as imaginary plane, where the intersection points between light traces (h1, h2, h3 ... ) are present and concentrated, and that substantially the same unit images are formed when a target object (T) is present on the imaginary plane. Further, referring to FIG. 10A, in addition to the imaginary plane in the position of the target object T, but also another imaginary plane where intersection points between the light traces h1, h2, h3 ... are concentrated is present in the position shown by the vertical double-dot dashed line a, for example.

Besides, in some cases, it may be required to obtain the distance from a compound-eye imaging device to a target object. However, this is not possible in the case of the compound-eye imaging device 100 with regularly arranged optical lenses (L11, L12 ... L33), because, as shown in FIG. 10A, when the target object T is far from the image capture device 100, the light traces h1, h2, h3 ... h8 of lights collected onto the optical lenses L11, L21 and L31 are substantially parallel to each other, so that the unit images imaged by all the imaging units U become substantially the same without parallax, making it impossible to obtain the required distance of the target object T.

Referring back to the first problem, in order to solve the problem of the reduction in the definition of a reconstructed image when a target object is indefinitely far, a compound-eye imaging device is known having imaging units of optical lenses and corresponding areas of a solid-state imaging element, in which the imaging units are adjusted in the position of the optical lenses and the solid-state imaging element such that the positional relationship between an optical lens and a corresponding area of the solid-state imaging element in an imaging unit is slightly offset from that in an adjacent imaging unit. Such a compound-eye imaging device is disclosed, for example, in Japanese Laid-open Patent Publication 2004-146619. However, such compound-eye imaging device does not sufficiently improve the definition of a reconstructed image.

More specifically, in the compound-eye imaging device disclosed in e.g. Japanese Laid-open Patent Publication 2004-146619, the optical lenses are regularly arranged in a matrix of rows and columns on one plane, while the solid-state imaging element has pixels successively offset slightly in the direction parallel to the one plane relative to the corresponding optical lenses. This offset positional relationship may, to a certain extent, reduce the probability that different imaging units form the same image from light from one same point on a target object, as compared to the case where the positional relationship among the optical lenses and the solid-state imaging element is constant. However, the regularity in the arrangement of the optical lenses prevents a significant reduction of such probability.

SUMMARY OF THE INVENTION

An object of the present invention is to provide a compound-eye imaging device which substantially prevents unit images formed by respective imaging units from being the same, making it possible to easily increase the definition of a reconstructed image.

According to the present invention, this object is achieved by a compound-eye imaging device comprising: multiple imaging units having optical lenses and a solid-state imaging element with a major surface for allowing the solid-state imaging element to image multiple unit images of a target object that are formed through the optical lenses; and reconstructed image forming means for forming a reconstructed image from the multiple unit images respectively imaged by the multiple imaging units, wherein the multiple imaging units are integrally arranged, and wherein the multiple imaging units have randomly different optical imaging conditions from each other to allow the multiple unit images imaged by the multiple imaging units to be different from each other when the target object is indefinitely far.

In the compound-eye imaging device of the present invention, the multiple imaging units have randomly different optical imaging conditions, so that it substantially prevents unit images formed by the respective imaging units from being the same, making it possible to easily increase the definition of a reconstructed image.

It can be designed so that the optical lenses of the multiple imaging units are arranged to have random distances between adjacent ones thereof in a direction parallel to the major surface of the solid-state imaging element so as to allow the multiple imaging units to have different optical imaging conditions from each other.

It can also be designed so that optical axes of the optical lenses of the multiple imaging units are inclined at random inclination angles in the multiple imaging units so as to allow the multiple imaging units to have different optical imaging conditions from each other.

It can further be designed so that focal lengths of the optical lenses of the multiple imaging units have random values so as to allow the multiple imaging units to have different optical imaging conditions from each other.

It can further be designed so that the optical lenses of the multiple imaging units have randomly different distortions so as to allow the multiple imaging units to have different optical imaging conditions from each other.

It can still further be designed so that the multiple imaging units have randomly different pixel arrangements of the solid-state imaging element so as to allow the multiple imaging units to have different optical imaging conditions from each other.

While the novel features of the present invention are set forth in the appended claims, the present invention will be better understood from the following detailed description taken in conjunction with the drawings.

BRIEF DESCRIPTION OF THE DRAWINGS

The present invention will be described hereinafter with reference to the annexed drawings. It is to be noted that all the drawings are shown for the purpose of illustrating the technical concept of the present invention or embodiments thereof, wherein:

FIG. 4A is a schematic side view of the compound-eye imaging device, placed vertically, in a mode of collecting lights from a target object by the optical lenses, while

FIG. 6B is a view showing a reconstructed image using the compound-eye imaging device, while

FIG. 10A is a schematic side view of the conventional compound-eye imaging device, placed vertically, in a mode of collecting lights from a target object by the optical lenses, while

DESCRIPTION OF THE PREFERRED EMBODIMENTS

Embodiments of the present invention, as best mode for carrying out the invention, will be described hereinafter with reference to the drawings. The present invention relates to a compound-eye imaging device. It is to be understood that the embodiments herein are not intended as limiting, or encompassing the entire scope of, the invention. Note that like parts are designated by like reference numerals or characters throughout the drawings.

First Embodiment

Figure 1:
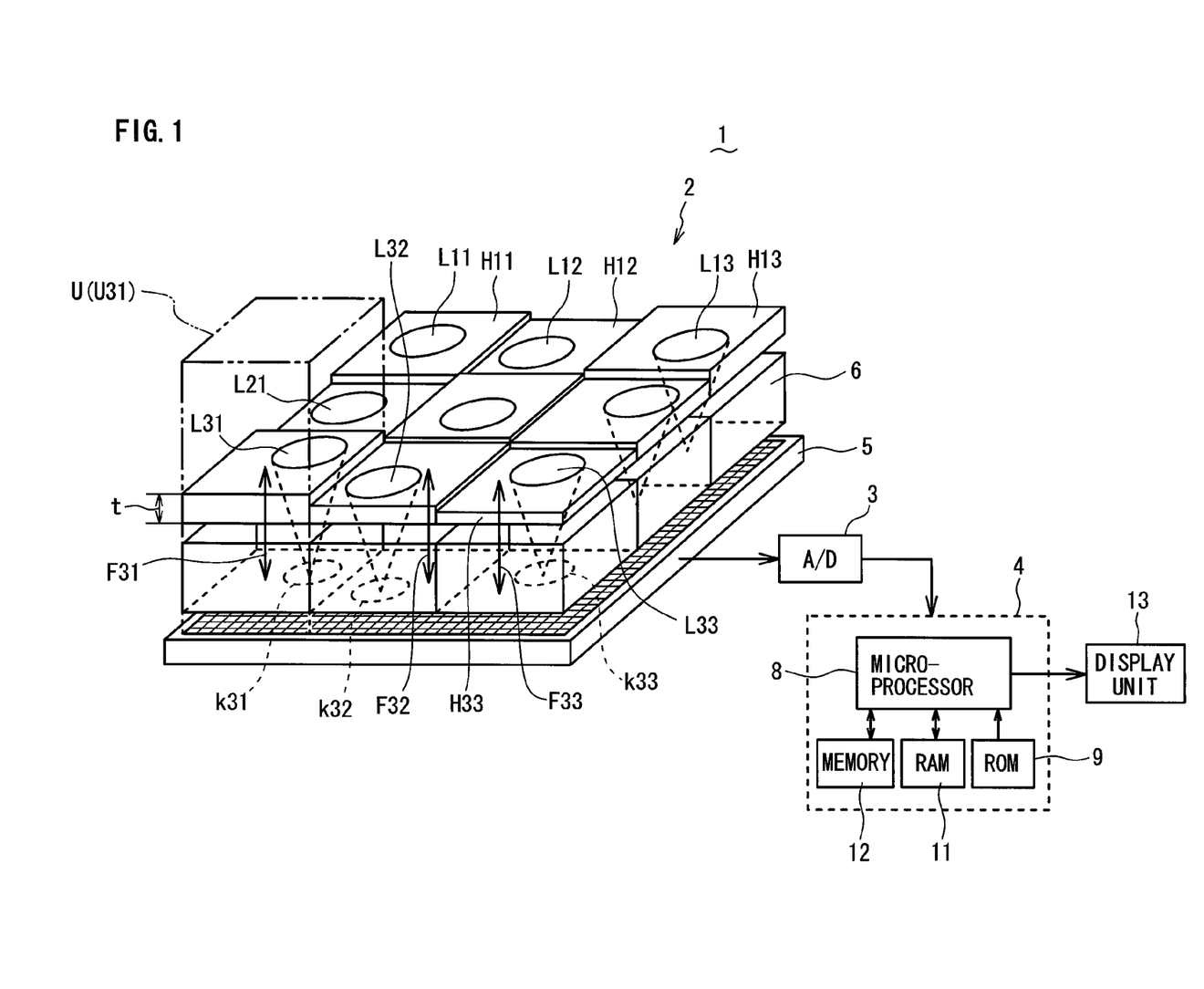
FIG. 1 is a schematic perspective view, with a block diagram, of a compound-eye imaging device according to a first embodiment of the present invention.

A compound-eye imaging device 1 according to a first embodiment of the present invention will be described with reference to FIG. 1 to FIG. 6. FIG. 1 is a schematic perspective view, with a block diagram, of the compound-eye imaging device 1 according to the first embodiment. As shown in FIG. 1, the compound-eye imaging device 1 comprises an imaging device body 2 for collecting light from a target object and forming an image therefrom, and an image processing unit 4 connected to the imaging device body 2 via an AD (Analog-to-Digital) converter 3 for forming a reconstructed image from image information (multiple unit images) output from the imaging device body 2.

The imaging device body 2 comprises: 9 (nine) optical lenses L11, L12 . . . L33 for collecting light from the target object; holders H11, H12 . . . H33 for holding the respective optical lenses L11, L12 . . . L33; a plate-shaped solid-state imaging element (photodetector array) 5 for imaging unit images k11, k12 . . . k33 formed by the respective optical lenses L11, L12 . . . L33; and a partition wall 6 placed between the solid-stating imaging element 5 and the optical lenses L11, L12 . . . L33. If the combination of each of the optical lenses L11, L12 . . . L33 with a corresponding divided area of the solid-state imaging element 5 for imaging each of the unit images k11, k12 . . . k33 is referred to as an imaging unit U, it is understood that the imaging device body 2 comprises 9 (nine) integrally arranged imaging units U11, U12 . . . U33. The partition wall 6 limits lights propagating from the optical lenses L11, L12 . . . L33 to the solid-state imaging element 5 so as to prevent such lights from interfering each other between the respective imaging units U. Note that although the imaging device body 2 is assumed to comprise 9 optical lenses L11, L12 . . . L33 forming 9 imaging units U11, U12 . . . U33 in the present embodiment, a much larger number of imaging units are actually formed.

The holders H11, H12 . . . H33 of the optical lenses are block members each having a square shape as seen in plan view, and each having a thickness set according to the focal length of each of the corresponding optical lenses L11, L12 . . . L33. More specifically, the thickness t of each of the holders H11, H12 . . . H33 is set so as to allow the optical lenses L11, L12 . . . L33 held thereby and having focal lengths F11, F12 . . . F33 to focus each of the corresponding unit images k11, k12 . . . k33 accurately on the surface of the solid-state imaging element 5. In other words, the thickness t of each of the holders H11, H12 . . . H33 is set so as to hold each of the corresponding optical lenses L11, L12 . . . L33 in a position distant from the surface of the solid-state imaging element 5 by each of the specific focal lengths F11, F12 . . . F33 of the optical lenses L11, L12 . . . L33.

Furthermore, in the compound-eye imaging device 1 of the present embodiment, the focal lengths F11, F12 . . . F33 of the 9 optical lenses L11, L12 . . . L33 are set to have random values, while the thickness t of each of the corresponding holders H11, H12 . . . H33 is set according to each of the random values of the focal lengths F11, F12 . . . F33. Here, the random values of the focal lengths F11, F12 . . . F33 are not just irregular values, but are those based on physical random numbers generated by a random number table, a random number generator or the like. Note that the 9 holders H11, H12 . . . H33 having various set values of thickness t as described above can be manufactured and integrated by preparing 9 such holders and bonding them using an adhesive.

Figure 2:
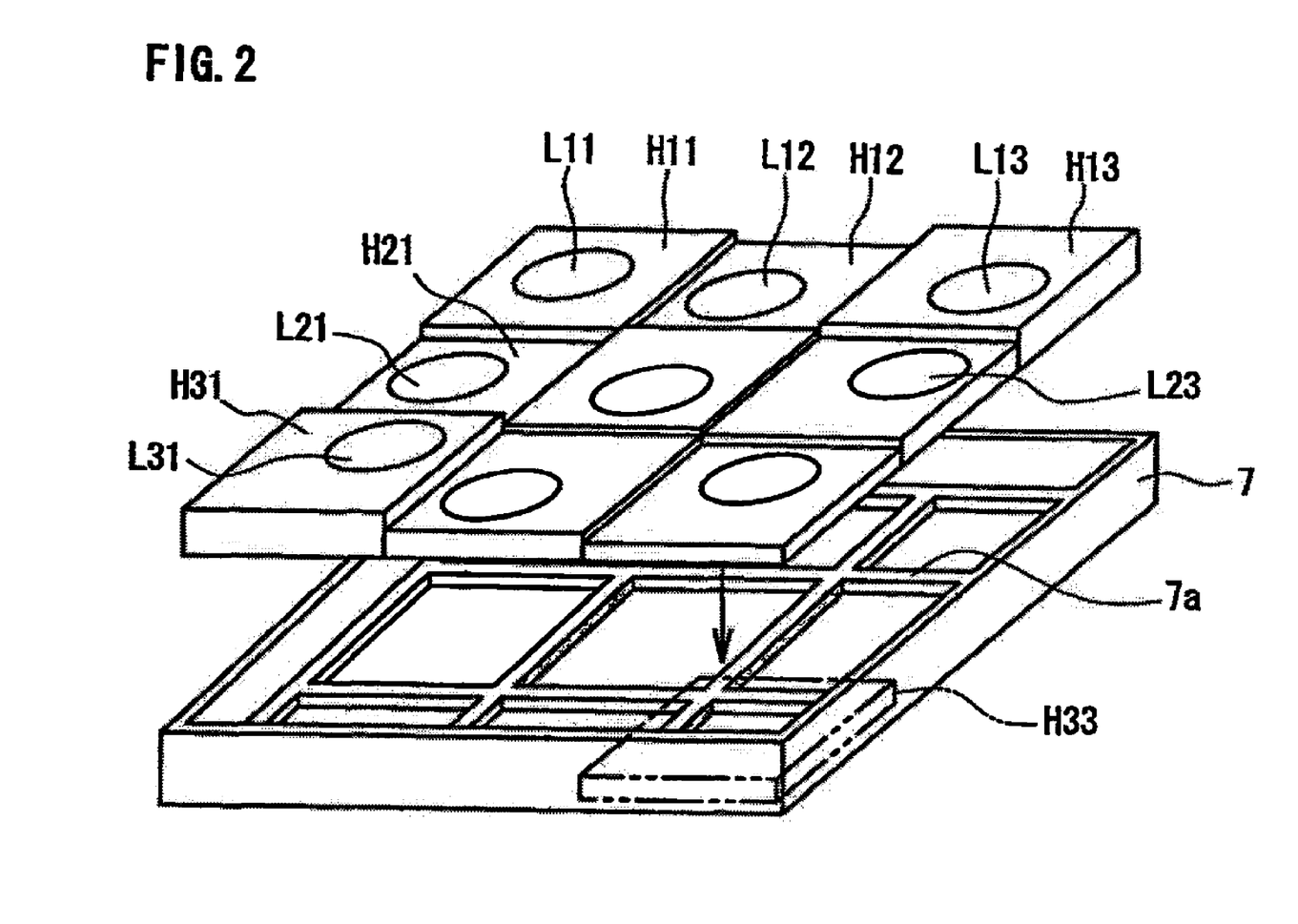
FIG. 2 is a schematic perspective view of optical lenses and lens holders to integrate the optical lenses in the compound-eye imaging device.

Alternatively, they can be manufactured and integrated in a manner as shown in FIG. 2 which is a schematic perspective view of the optical lenses L11, L12 . . . L33 and the holders H11, H12 . . . H33 to integrate the optical lenses L11, L12 . . . L33. More specifically, as shown in FIG. 2, the 9 holders H11, H12 . . . H33 can be integrated and inserted into a frame 7 formed to have a size and shape to allow the 9 holders H11, H12 . . . H33 fit therein, and thereafter bonded using an adhesive. It is desirable to provide the frame 7 with a cross-piece 7a at its bottom to prevent falling of holders H11, H12 . . . H33, and facilitate positioning them. The use of the frame 7 having such structure makes it possible to integrate many holders H11, H12 . . . H33 with their bottom surfaces aligned.

Figure 3:
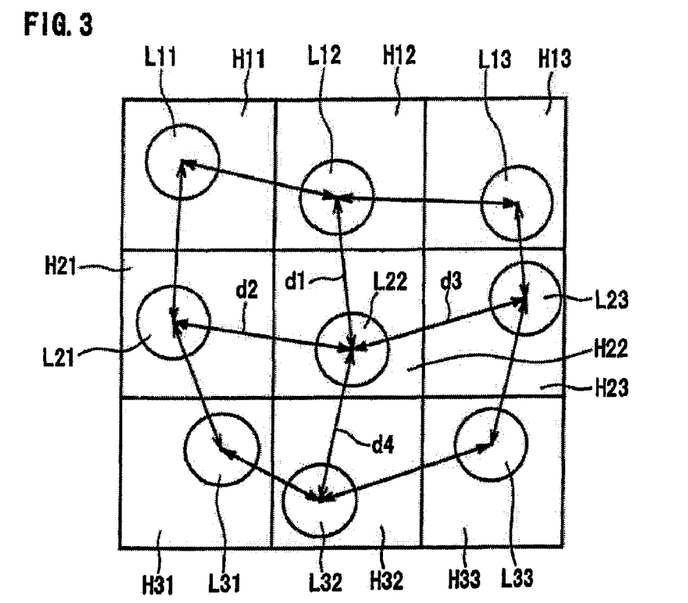
FIG. 3 is a schematic plan view showing an arrangement of the optical lenses in the compound-eye imaging device.

A feature of the present invention is that the multiple imaging units of the compound-eye imaging device 1 have randomly different optical imaging conditions. In the present embodiment, the 9 optical lenses L11, L 12 . . . L33 held by the holders H11, H12 . . . H33 are arranged to have random distances (intervals or center-to-center distances) d between adjacent ones thereof in a direction parallel to the surface (major surface) of the solid-state imaging element 5 (i.e. the distances d are randomly offset from each other) so as to be in random positions as seen in plan view with the optical lenses H11, H12 . . . H33 being integrated in e.g. a manner shown in FIG. 1. This is more specifically shown in FIG. 3 which is a schematic plan view showing an arrangement of the optical lenses L11, L12 . . . L33 in the compound-eye imaging device 1. As shown in FIG. 3, the distances (center-to-center distances) d between adjacent optical lenses L11, L12 . . . L33 in the direction parallel to the surface of the solid-state imaging element 5 are randomly different so as to cause the respective positions (center positions) of the optical lenses L11, L12 . . . L33 in the holders H11, H12 . . . H33 to be different from each other as seen in plan view.

For example, considering the optical lens L22 held by the central holder H22 in FIG. 3, the optical lens L22 is positioned at distances d1, d2, d3 and d4 from the four adjacent optical lenses L12, L21, L23 and L32, in which the distances d1, d2, d3 and d4 are random or randomly different from each other. Similarly, each of the other optical lenses L11, L12 . . . L33 is positioned at random distances from adjacent optical lenses. Thus, similarly as in the random values of the focal lengths F11, F12 . . . F33 of the optical lenses L11, L12 . . . L33, the random distances referred to here are not just irregular values, but are random values based on physical random numbers generated by a random number table, a random number generator or the like.

Referring back to FIG. 1, the image processing unit 4 will be described. The image processing unit 4 in the compound-eye imaging device 1 of the present embodiment comprises a microprocessor 8, a ROM (Read Only Memory) 9 storing an operation program of the microprocessor 8, a RAM (Random Access Memory) 11 for temporarily storing e.g. image data, and a large capacity memory 12. Based on the image information of 9 unit images k11, k12 . . . k33 received from the imaging device body 2, the microprocessor 8 forms a reconstructed image, and displays it on a display unit 13 such as a liquid crystal panel. A known process similar to that described in Japanese Laid-open Patent Publication 2001-61109 can be used as the process for the microprocessor 8 to perform to form a reconstructed image from the multiple unit images k11, k12 . . . k33. For example, the microprocessor 8 can: first receive, as digital image information, the 9 unit images k11, k12 . . . k33 imaged by the solid-state imaging element 5; calculate distances for respective pixels based on the respective unit images to create a distance image; and rearrange the unit images k11, k12 ... k33 for the respective pixels based on the created or calculated distance image so as to form a reconstructed image.

Figure 4A:
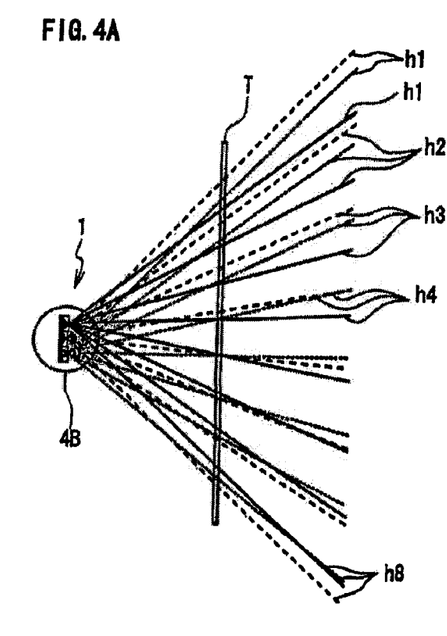

As described in the foregoing, in the compound-eye imaging device 1 of the present embodiment, the focal lengths F11, F12 ... F33 of the optical lenses L11, L12 ... L33 in the respective imaging units U are randomly different, and the distances d (d1, d2 ... ) between the optical lenses L11, L12 ... L33 also have randomly different values, so that the unit images k11, k12 ... k33 imaged by the solid-state imaging element 5 are different from each other regardless of the position of the target object relative to the compound-eye imaging device 1. This will be described in more detail below with reference to FIG. 4A and FIG. 4B. FIG. 4A is a schematic side view of the compound-eye imaging device 1, placed vertically, in a mode of collecting lights from a target object T by the optical lenses L11, L12 ... L33, in which the target object T is positioned in front of the compound-eye imaging device 1, while FIG. 4B is a schematic enlarged side view of a portion of FIG. 4A as indicated by the dashed circle 4B.

Figure 4B:
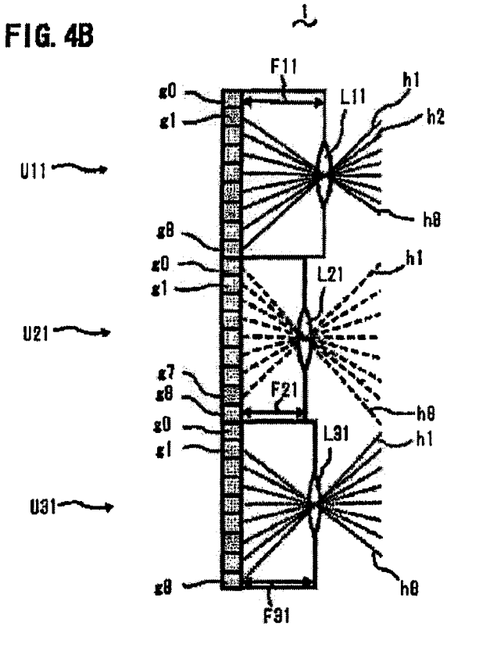
FIG. 4B is a schematic enlarged side view of a portion of FIG. 4A as indicated by dashed circle 4B.

Both FIG. 4A and FIG. 4B show light traces h1, h2 ... h8 of lights collected by the respective optical lenses L11, L21 and L31 to reach the respective pixels g1, g2 ... g8 of the solid-state imaging element 5, in which such light traces for the optical lenses L11, L21 and L31 are shown by solid lines, coarse dashed lines and fine dashed lines in order from top to bottom. Note that FIG. 4B is shown in side view, so that it shows only the optical lenses L11, L21 and L31 in the leftmost column of FIG. 1. In the compound-eye imaging device 1 of the present embodiment, the focal lengths F11, F21 and F31 of the optical lenses L11, L21 and L31 are randomly different in the respective imaging units U, and the distances d between the respective optical lenses L11, L21 and L31 have random values as described above. Thus, the respective light traces h1, h2 ... h8 have randomly different angles to the horizontal direction in the respective imaging units U, and are converged at points which are randomly offset left or right in FIG. 4A. Thus, as shown in FIG. 4A, the respective light traces h1, h2 ... h8 are not parallel to each other, causing the intersection points between the light traces h1, h2 ... h8 to scatter horizontally.

In addition, the modes in which the lights with the light traces h1, h2 h8 enter the pixels g1, g2 ... g8 randomly change in the respective imaging units U. For example, considering the imaging unit U11, the uppermost light with the light trace h1 enters the lowermost pixel g8, and the lowermost light with the light trace h8 enters the pixel g1. However, considering the imaging unit U21, the uppermost light with the light trace h1 enters the second lowermost pixel g7, and the lowermost light with the light trace h8 enters the pixel g0. In this way, random changes occur in the compound-eye imaging device 1 of the present embodiment. Further, referring to FIG. 4A, assuming cases where a target object T is present in front the compound-eye imaging device 1, it is understood that it prevents many intersection points between the light traces h1, h2 ... h8 from being present on the surface of (i.e. in the position of) the target object T. Thus, it is understood that the unit images k11, k12 ... k33 imaged by the imaging units U11, U12 ... U33 are different from each other.

Figure 5:
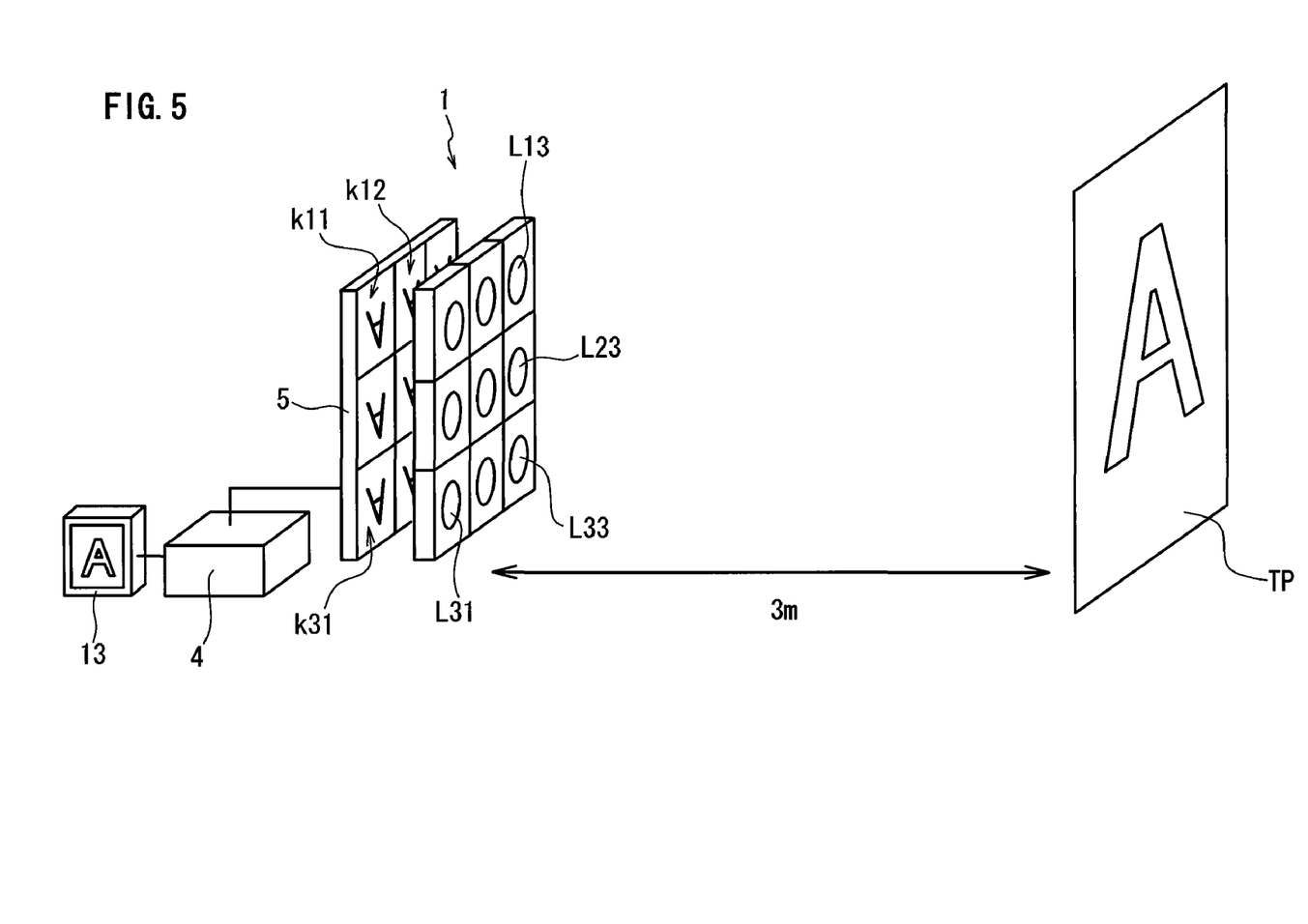
FIG. 5 is a schematic view of an experimental system using the compound-eye imaging device for imaging a target picture.

Next, referring to FIG. 5 and FIGS. 6A, 6B and 6C, experimental results obtained by imaging a target picture TP placed at a predetermined distance, using the compound-eye imaging device 1 of the present embodiment, will be described. FIG. 5 is a schematic view of an experimental system using the compound-eye imaging device 1 for imaging the target picture TP. The target picture TP was placed in front of, and at a distance of 3 m (meters) from, the compound-eye imaging device 1, placed vertically, so as to normally face the compound-eye imaging device 1. The compound-eye imaging device 1 received light from the target picture TP, in which the respective optical lenses L11, L12 ... L33 collected the light to form 9 unit images k11, k12 ... k33 on the solid-state imaging element 5 which imaged these unit images. The image processing unit 4 then formed one reconstructed image from the 9 unit images k11, k12 ... k33.

Figure 6A:
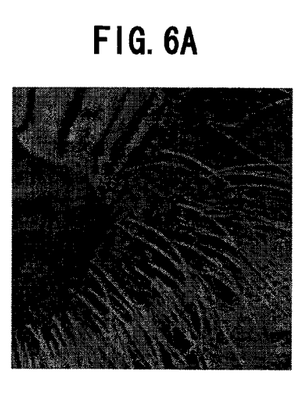
FIG. 6A is a view showing the target picture used for the experiment.
Figure 6B:
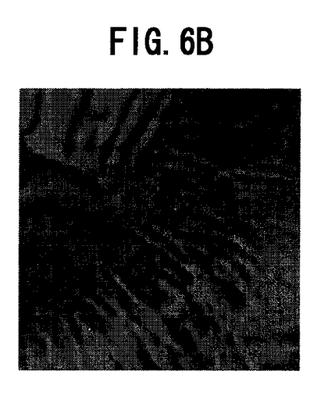
Figure 6C:
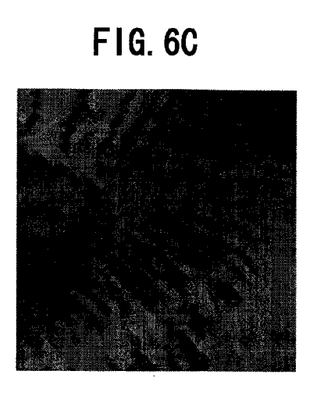
FIG. 6C is a view showing a reconstructed image using a conventional compound-eye imaging device for comparison.

FIG. 6A is a view showing the target picture TP (enlarged picture of a portion of a face of a hamadryas) used for the experiment, FIG. 6B is a view showing the reconstructed image using the compound-eye imaging device 1, while FIG. 6C is a view showing a reconstructed image using a conventional compound-eye imaging device for comparison. Referring to FIGS. 6A and 6B, a clear reconstructed image was obtained (FIG. 6A) even though the target picture TP was placed at a distance of 3 m from the compound-eye imaging device 1, which is substantially equivalent to an indefinite distance (indefinitely far). For comparison, a conventional compound-eye imaging device (one shown in FIG. 9) was prepared which was the same as the compound-eye imaging device 1 of the present embodiment, except that the optical lenses were regularly arranged on the optical lens array in a matrix of rows and columns. FIG. 6C shows a less clear image than that of FIG. 6B.

The definition of each reconstructed image relative to the original image (target picture TP) was evaluated using PSNR (Peak Signal to Noise Ratio) method. The results of the evaluations indicated that the PSNR value of the reconstructed image (FIG. 6B) obtained by using the compound-eye imaging device 1 of the present embodiment was 23.1 dB, whereas the PSNR value of the reconstructed image (FIG. 6C) obtained by using the conventional compound-eye imaging device was 20.7 dB relative to the target picture TP. In the experiments, a calculation was also made as to an average error of an estimated distance value in a distance image which was created in the process performed by the image processing unit 4 in each of the two compound-eye imaging devices to form a reconstructed image. The results indicated that the average error was as small as 3.9% in the distance image created from the unit images using the compound-eye imaging device 1 of the present embodiment, whereas the average error was as large as 133.9% in the distance image created from the unit images using the conventional compound-eye imaging device.

Second Embodiment

Figure 7:
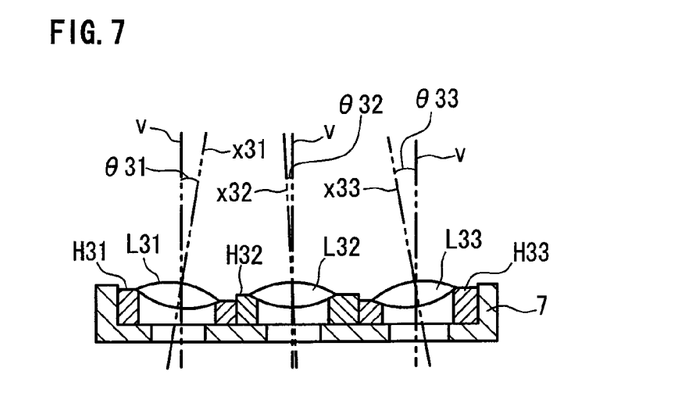
FIG. 7 is a schematic cross-sectional view of the optical lenses and holders as a part of the compound-eye imaging device according to a second embodiment of the present invention.

Referring now to FIG. 7, a compound-eye imaging device 1 according to a second embodiment of the present invention will be described. FIG. 7 is a schematic cross-sectional view of optical lenses L31, L32 and L33 and holders H31, H32 and H33 as a part of the compound-eye imaging device 1 of the present embodiment. The compound-eye imaging device 1 of the present embodiment is substantially the same as that of the first embodiment except for the following. In the compound-eye imaging device 1 of the first embodiment, the focal lengths F11, F12 ... F33 of the optical lenses L11, L12 ... L33 have randomly different values, and the distances d between the optical lenses L11, L12 ... L33 are set to have randomly different values so as to allow the imaging units U to have different optical imaging conditions from each other. In contrast, in the present embodiment, the optical lenses L11, L12 ... L33 are randomly inclined, i.e. are designed to have optical axes inclined at random angles in the imaging units U.

More specifically, as apparent from FIG. 7, the shapes of the holders H11, H12 . . . H33 for holding the optical lenses L11, L12 . . . L33 are deformed from those of the first embodiment so as to allow inclination angles θ11, θ12 . . . θ33 of optical axes x11, x12 . . . x33 of the respective optical lenses L11, L12 . . . L33 relative to the vertical axis v (vertical to the solid-state imaging element 5) to have random values so as to allow the optical axes x11, x12 . . . x33 to be randomly inclined. Similarly as in the first embodiment, the random values referred to here are not just irregular values, but are random values based on physical random numbers generated by a random number table, a random number generator or the like. Note that FIG. 7 shows a cross section of the 3 (three) optical lenses L31, L32 and L33 in the frontmost row of FIG. 1. The requirement described here is to be also applied to the other optical lenses L11, L12 . . . L23 and holders H11, H12 . . . H23. The requirement to incline the optical axes of the optical lenses in the imaging units at random angles, as recited in claim 3, includes a condition in which, for example, the optical axes of two optical lenses are inclined at the same angle relative to the vertical axis v, but are inclined relative to each other because the two optical axes are rotated about the vertical axis at different rotation angles.

Similarly as in the first embodiment, also in the compound-eye imaging device 1 of the present embodiment, the respective light traces h1, h2 . . . h8 of lights collected to the compound-eye imaging device 1 are not parallel to each other, causing the intersection points between the light traces h1, h2 . . . h8 to scatter horizontally, whereby the unit images k11, k12 . . . k33 imaged by the solid-state imaging element 5 become different from each other. This makes it possible to easily form a higher definition reconstructed image.

Third Embodiment

Figure 8:
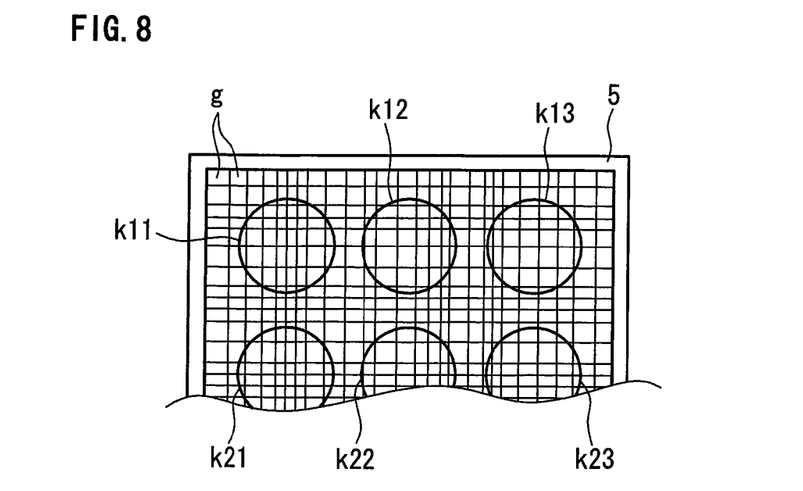
FIG. 8 is a schematic plan view showing a part of a solid-state imaging element in the compound-eye imaging device according to a third embodiment of the present invention.

Referring now to FIG. 8, a compound-eye imaging device 1 according to a third embodiment of the present invention will be described. FIG. 8 is a schematic plan view showing a part of a solid-state imaging element 5 in the compound-eye imaging device 1. The compound-eye imaging device 1 of the present embodiment is substantially the same as that of the first embodiment except that here the focal lengths F11, F12 . . . F33 of the optical lenses L11, L12 . . . L33 are the same, and the distances d between the optical lenses L11, L12 . . . L33 are set to be the same, while the pixels g of the solid-state imaging element 5 are randomly arranged so as to allow the respective imaging units U to have different optical imaging conditions. More specifically, the pixels g of the solid-state imaging element 5 in the present embodiment are not regularly arranged in a matrix of rows and columns, but are randomly arranged as shown in FIG. 8.

Similarly as in the first embodiment, also in the compound-eye imaging device 1 of the present embodiment, the respective light traces h1, h2 . . . h8 of lights collected to the compound-eye imaging device 1 are not parallel to each other, causing the intersection points between the light traces h1, h2 . . . h8 to scatter horizontally, whereby the unit images k11, k12 . . . k33 imaged by the solid-state imaging element 5 become different from each other. This makes it possible to easily form a higher definition reconstructed image.

As described in the foregoing, the compound-eye imaging devices 1 of the respective embodiments of the present invention make it possible to allow the imaging units U to have randomly different optical imaging conditions in various modes. One mode is to randomly offset the distances d between the optical lenses L11, L12 . . . L33, namely, the optical lenses L11, L12 . . . L33 are arranged to have random distances between adjacent ones thereof in a direction parallel to the surface of the solid-state imaging element 5 as recited in claim 2. Another mode is to allow the focal lengths F11, F12 . . . F33 of the optical lenses L11, L12 . . . L33 to have random values as recited in claim 4.

A still another mode is to incline the optical axes x11, x12 . . . x33 of the optical lenses L11, L12 . . . L33 at random inclination angles as recited in claim 3. Yet another mode is to allow the imaging units U to have randomly different pixel arrangements of the solid-state imaging element 5 as recited in claim 6. In addition to these modes, the compound-eye imaging device of the present invention can have a mode to allow the optical lenses L11, L12 . . . L33 in the respective imaging units U to have randomly different optical distortions as recited in claim 5. More specifically, instead of randomly arranging the pixels g of the solid-state imaging element 5 in the third embodiment, the optical lenses L11, L12 . . . L33 can be designed to have randomly different optical distortions so as to obtain similar desired results. Note that these modes can be used alone, or in combination with another, to obtain desired results.

The present invention has been described above using presently preferred embodiments, but such description should not be interpreted as limiting the present invention. Various modifications will become obvious, evident or apparent to those ordinarily skilled in the art, who have read the description. Accordingly, the appended claims should be interpreted to cover all modifications and alterations which fall within the spirit and scope of the present invention.

This application is based on Japanese patent application 2008-048035 filed Feb. 28, 2008, the content of which is hereby incorporated by reference.

What is claimed is:

1. A compound-eye imaging device comprising:
multiple imaging units having optical lenses and a solid-state imaging element with a major surface for allowing the solid-state imaging element to image multiple unit images of a target object that are formed through the optical lenses; and
reconstructed image forming means for forming a reconstructed image from the multiple unit images respectively imaged by the multiple imaging units,
wherein the multiple imaging units are integrally arranged,
wherein the multiple imaging units have randomly different optical imaging conditions from each other to allow the multiple unit images imaged by the multiple imaging units to be different from each other when the target object is indefinitely far, and
wherein optical axes of the optical lenses of the multiple imaging units are inclined at random inclination angles in the multiple imaging units so as to allow the multiple imaging units to have different optical imaging conditions from each other.

2. A compound-eye imaging device comprising:
multiple imaging units having optical lenses and a solid-state imaging element with a major surface for allowing the solid-state imaging element to image multiple unit images of a target object that are formed through the optical lenses; and
reconstructed image forming means for forming a reconstructed image from the multiple unit images respectively imaged by the multiple imaging units,
wherein the multiple imaging units are integrally arranged,
wherein the multiple imaging units have randomly different optical imaging conditions from each other to allow the multiple unit images imaged by the multiple imaging units to be different from each other when the target object is indefinitely far, and wherein the multiple imaging units have randomly different pixel arrangements of the solid-state imaging element so as to allow the multiple imaging units to have different optical imaging conditions from each other.

* * * * *